US010216363B2

(12) United States Patent
Gronow et al.

(10) Patent No.: US 10,216,363 B2
(45) Date of Patent: *Feb. 26, 2019

(54) NAVIGATING A NETWORK OF OPTIONS

(71) Applicant: SOMEONES GROUP INTELLECTUAL PROPERTY HOLDINGS PTY LTD ACN 131 335 325, Melbourne (AU)

(72) Inventors: Brett James Gronow, Melbourne (AU); Keith David Deverell, Collingwood (AU); Jonathan David Pak, Fitzroy North (AU)

(73) Assignee: Someones Group Intellectual Property Holdings PTY LTD ACN 131 335 325, Fitzroy (AU)

( * ) Notice: Subject to any disclaimer, the term of this patent is extended or adjusted under 35 U.S.C. 154(b) by 298 days.

This patent is subject to a terminal disclaimer.

(21) Appl. No.: 14/816,395

(22) Filed: Aug. 3, 2015

(65) Prior Publication Data

US 2016/0196015 A1    Jul. 7, 2016

Related U.S. Application Data

(63) Continuation of application No. 13/389,010, filed as application No. PCT/AU2010/001015 on Aug. 10, 2010, now Pat. No. 9,098,171.

(30) Foreign Application Priority Data

Aug. 11, 2009 (AU) .................. 2009903737

(51) Int. Cl.
*G06F 3/0482* (2013.01)
*G06F 3/0481* (2013.01)
*G06F 3/0484* (2013.01)

(52) U.S. Cl.
CPC ........ *G06F 3/0482* (2013.01); *G06F 3/04812* (2013.01); *G06F 3/04842* (2013.01)

(58) Field of Classification Search
CPC ..... G06F 3/0481; G06F 3/0484; G06F 3/0482
See application file for complete search history.

(56) References Cited

U.S. PATENT DOCUMENTS 5,261,042 A    11/1993 Brandt
5,459,488 A    10/1995 Geiser
(Continued)

FOREIGN PATENT DOCUMENTS

AU    2009903737    8/2009
EP    1105817        6/2001
(Continued)

OTHER PUBLICATIONS

Extended European Search Report for European Patent Application No. 10807785.0, dated Jun. 9, 2016.
(Continued)

*Primary Examiner* — David E Choi
(74) *Attorney, Agent, or Firm* — Katten Muchin Rosenman LLP

(57) ABSTRACT

A method, system and controller is provided for navigating a network of options on an interactive display. A navigation pane on a display is defined (1201) and a first set of options is displayed in the navigation pane as divided sub-regions which may be separated by lines (1202). The options corresponding to the sub-regions may be identified with text or other meaningful symbols or images. Sub-region area may correspond to relative importance of each option. A selector is monitored for activation when a pointer is within one of the sub-regions (1203). If the selected option is a node the sub-region associated with the selected option may be (Continued)

magnified in a zooming motion and the second set of options is displayed in the navigation pane (1204, 1206, 1207).

18 Claims, 9 Drawing Sheets

(56) References Cited

U.S. PATENT DOCUMENTS

| | | | |
|---|---|---|---|
| 5,463,727 | A | 10/1995 | Wiggins et al. |
| 5,621,905 | A | 4/1997 | Jewson et al. |
| 6,154,750 | A | 11/2000 | Roberge et al. |
| 6,157,364 | A | 12/2000 | Kohler |
| 6,188,407 | B1 | 2/2001 | Smith et al. |
| 6,407,756 | B1 | 6/2002 | Sontag et al. |
| 6,731,316 | B2 | 5/2004 | Herigstad et al. |
| 6,947,062 | B2 | 9/2005 | Cuijpers et al. |
| 7,111,788 | B2 | 9/2006 | Reponen |
| 7,149,981 | B1 | 12/2006 | Lundy et al. |
| 7,290,223 | B2 | 10/2007 | Decombe |
| 7,523,414 | B2 | 4/2009 | Schmidt et al. |
| 7,676,763 | B2 | 3/2010 | Rummel |
| 7,752,534 | B2 | 7/2010 | Blanchard, III et al. |
| 7,801,897 | B2 | 9/2010 | Egnor |
| 7,952,570 | B2 | 5/2011 | Lipman et al. |
| 7,996,788 | B2 | 8/2011 | Carmichael |
| 8,065,628 | B2 | 11/2011 | Oshiro et al. |
| 8,279,241 | B2 | 10/2012 | Fong |
| 8,560,398 | B1 | 10/2013 | Gregov et al. |
| 2003/0187744 | A1 | 10/2003 | Goodridge, Jr. |
| 2003/0197740 | A1 | 10/2003 | Reponen |
| 2004/0095373 | A1 | 5/2004 | Schmidt et al. |
| 2006/0070012 | A1 | 3/2006 | Milener et al. |
| 2006/0149774 | A1 | 7/2006 | Egnor |
| 2007/0033632 | A1 | 2/2007 | Baynger et al. |
| 2007/0271516 | A1 | 11/2007 | Carmichael |
| 2008/0072145 | A1 | 3/2008 | Blanchard et al. |
| 2008/0134043 | A1 | 6/2008 | Georgis et al. |
| 2008/0320413 | A1 | 12/2008 | Oshiro et al. |
| 2009/0007012 | A1 | 1/2009 | Mandic et al. |
| 2009/0132942 | A1 | 5/2009 | Santoro et al. |
| 2009/0187864 | A1 | 7/2009 | Bedell |
| 2009/0271368 | A1 | 10/2009 | Chanell |
| 2010/0060666 | A1 | 3/2010 | Fong |
| 2010/0106752 | A1 | 4/2010 | Eckardt, III et al. |
| 2010/0131188 | A1 | 5/2010 | Yeh et al. |
| 2010/0250336 | A1 | 9/2010 | Selinger et al. |
| 2010/0293056 | A1 | 11/2010 | Flynt et al. |
| 2010/0295803 | A1 | 11/2010 | Kim et al. |
| 2010/0325583 | A1 | 12/2010 | Aami et al. |
| 2011/0173068 | A1 | 7/2011 | O'Hanlon |
| 2011/0307792 | A1 | 12/2011 | DeLuca |
| 2011/0316888 | A1 | 12/2011 | Sachs et al. |
| 2011/0320380 | A1 | 12/2011 | Zahn et al. |
| 2012/0011530 | A1 | 1/2012 | Bentolila et al. |
| 2012/0030135 | A1 | 2/2012 | Weiss et al. |
| 2012/0137220 | A1 | 3/2012 | Gronow et al. |
| 2012/0162265 | A1 | 6/2012 | Heinrich et al. |
| 2012/0310771 | A1 | 12/2012 | Selinger et al. |
| 2013/0073979 | A1 | 3/2013 | Shepherd et al. |
| 2013/0282486 | A1 | 10/2013 | Rahle et al. |

FOREIGN PATENT DOCUMENTS

| | | |
|---|---|---|
| WO | 00/13103 A1 | 3/2000 |
| WO | 01/61456 A2 | 8/2001 |
| WO | 2008/115842 A1 | 9/2008 |

OTHER PUBLICATIONS

Grokker—2007.
Squarified Treemaps in XAML & C# using Microsoft Longhorn—CodeProject.
Australian Patent Office, International Search Report and Written Opinion on PCT/AU2010/001015, dated Nov. 11, 2010, Woden Act 2606, Australia.
Alex Aris et al., "Exploiting Location and Time for Photo Search and Storytelling in MyLifeBits," Sep. 1, 2004, retrieved from the internet at <URL:http://research.microsoft.comjpubs/70099jtr-2004-102.pdf> on May 14, 2014.
Deligiannidis L et al: "Event visualization in a 3D environment", Human System Interactions, 2008 Conference on, IEEE, Piscataway, NJ, USA, May 25, 2008, pp. 158-164.
May 23, 2014 Extended European Search Report for European Patent Application No. 10807784.3.
Patent Examination Report No. 1 for Australian Patent Application No. 2010282212 dated Sep. 9, 2015.

| ☐ SOMEONE > MEDIA LIBRARY > MUSIC | | | | | | WB WS FH LO |

| FILTER | | | | | | |
|---|---|---|---|---|---|---|
| electronic | indie | chillout | Pop | indie rock | trip hop | alternative rock |
| | | experimental | folk | idm | 90s | soul |
| Rock | hip | | | jazz | classic rock | dance |
| | female vocalists | ambiant | instrumental | | | |
| | | | | downtempo | blues | soundtrack |
| alternative | electronica | singer songwrirer | Rap | 80s | british | funk |

Figure 8

Figure 9
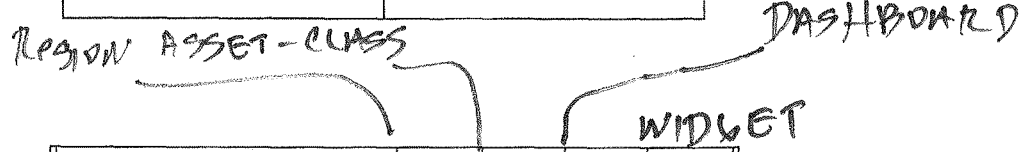
Figure 10
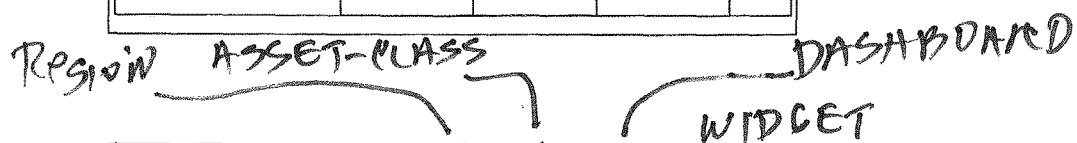
Figure 11

NAVIGATING A NETWORK OF OPTIONS

This application is a continuation of U.S. patent application Ser. No. 13/389,010, filed Feb. 6, 2012, now U.S. Pat. No. 9,098,171, issued Aug. 4, 2015 which is a 371 of PCT/AU2010/001015, filed Aug. 10, 2010, which claims the priority of Australian Appln. No. 2009903737, filed Aug. 11, 2009 the contents of all incorporated herein by reference.

FIELD

The present invention relates to a computerized method, system and controller for navigating a network of options on an interactive display.

BACKGROUND TO THE INVENTION

Navigation methods implemented in computer software are known for allowing a user to interactively navigate amongst a network of options or other multi-choice items on a screen. At each node in the network, the user is commonly presented with a menu list of the options branching from the node, and selects one of the options using a pointing device such as a mouse and typically a selection device such as a mouse button. If the selected option is another node in the network, another menu list appears either next to or in substitution of the previous menu list. The menu lists are typically provided as drop-down menus but may also take the form of a set of icons or clickable locations on the screen surrounded by space occupied by explanatory information.

Such navigation methods have the common disadvantage that the user quickly becomes disoriented when the network is only moderately complex, and perceives the process of selection as a chore requiring substantial dexterity and focus.

There is therefore a need for alternative or enhanced methods and systems for navigating option networks.

SUMMARY OF THE INVENTION

According to a first aspect of the invention there is provided a method of navigating a network of options for display to a user on a display device and selection by the user with a pointer and a selector, comprising:

defining a two-dimensional navigation region on the display;

displaying a set of options branching from a node in the network as the navigation region divided into a plurality of sub-regions;

recording selection by the user of a selected option if the selector is activated by the user when the pointer is pointing within its corresponding sub-region; and if the selected option is a second node having a second set of options branching therefrom, repeating the steps of displaying and recording for a second set of options.

In one embodiment, the set of options corresponds to a set of records or categories of records in a database.

In one embodiment, the method further comprises selecting a backup selector during display of the second set of options to cause the display within the navigation region to zoom out to display a previous set of options again in the navigation region.

In one embodiment, the displaying of the second option before selection comprises faint displaying of the divisions of the plurality of sub-regions for the second set of options branching from the second node in miniature within the sub-region associated with the second option so as to provide an enhanced sensation of navigation within a landscape.

In one embodiment, the plurality of sub-regions is divided by straight or curved border lines. In this embodiment, an area of each sub-region corresponding to each of the set of options may be a measure of importance or relevance of the respective option. The set of options may correspond to a set of categories of records in a database and the measure of importance or relevance is the number of records in each category.

According to a second aspect of the invention there is provided a navigation system comprising:

a display, pointer and selector for navigation of a network of options by a user;

a navigation region definer for defining a navigator region on the display;

an option set displayer for displaying a set of options branching from a node in the network as the navigation region divided into a plurality of sub-regions;

a selection recorder for recording selection by the user of a selected option from the set of options if the selector is activated by the user when the pointer is pointing within its corresponding sub-region;

a selection magnifier for magnifying the display of the corresponding sub-region of the selected option to substantially fill the navigation region if the selected option is a node in the network of options.

According to a third aspect of the invention there is provided a navigation controller for controlling navigation of a network of options by a user manipulating a pointer and selector on a display, comprising:

a navigation region definer for defining a navigation region on the display;

an option set displayer for displaying a set of options branching from a node in the network as the navigation region divided into a plurality of sub-regions;

a selection recorder for recording selection by the user of a selected option from the set of options if the selector is activated by the user when the pointer is pointing within its corresponding sub-region;

a selection magnifier for magnifying the display of the corresponding sub-region of the selected option to substantially fill the navigation region if the selected option is a node in the network of options.

According to a fourth aspect of the invention there is provided computer program code when executed by a computer causes the computer to implement any of the embodiments of the method of navigation of the first aspect of the invention.

According to a fifth aspect of the invention there is provided a computer readable medium comprising the program code of the fourth aspect of the invention.

According to a sixth aspect of the invention there is provided a data signal comprising the computer program code of the fourth aspect of the invention.

BRIEF DESCRIPTION OF DRAWINGS

FIGS. 6, 7 and 8 show an actual set of displays according to an example of the invention; and FIGS. 9, 10 and 11 show an actual set of displays according to another example of the invention.

DETAILED DESCRIPTION OF EMBODIMENTS

Figure 1:
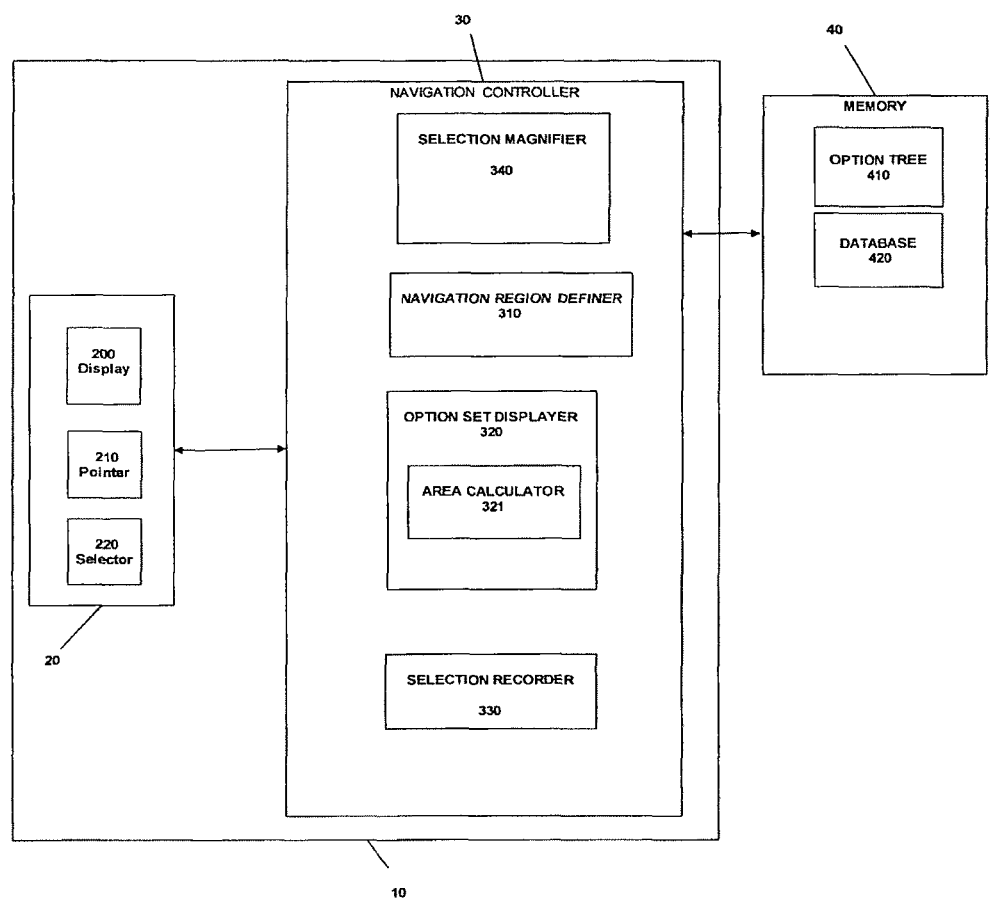
FIG. 1 is a block diagram of an example navigation system and controller of the current invention.

Referring to the drawings, there is shown various aspects of a navigation system, controller and method according to the invention.

The system may take a number of different forms. In a first form, a stand alone system is provided wherein all or most components required are present in a local user operable computer and interface.

In a second form, a distributed architecture is provided wherein some of the components required for implementing the system are present in local user operable computer and interface and some of the components are located remotely relative to the user. For example, a "thick client" architecture may be used wherein part of the navigation is executed on a local user operable computer and interface and part of the navigation is executed remotely, such as by a server; or a "thin client" architecture may be used wherein most of the navigation is executed remotely such as by a server and a local machine is used only for the user interface.

A typical web-based implementation involves a conventional personal computer with display, keyboard and mouse or touch sensitive screen, implementing the navigation controller as an XML program which may be downloaded from a website. Where the navigation involves a database search, the database will typically be stored remotely from the user and be interrogated by the navigation controller.

Referring now to FIG. 1, the core components at the broadest level are the navigation system 10 comprising a user interface 20 and a navigation controller 30, communicating with a memory 40 which may be located both locally and remotely and may include a database.

Components of the user interface include a display 200 such as an LCD monitor, a pointer 210 such as a mouse for the user to indicate a position on the display 200 and a selector 220 such as a mouse button to enable the user to select the position indicated by pointer 210. Typically there will also be provided alternative selectors such as right-button or other interface devices such as a scroll wheel. In the case of a touch screen the pointer is provided by a detected proximate finger or pen tip and the selector by a finger or pen touch or gesture.

The navigation controller 30 is in data communication with the user interface 20 and typically contains or is implemented on a processor that processes the navigation in accordance with user input and option network 410 and outputs navigation display 200. Herein the term "processor" is used to refer generically to any device that can perform this function and may include: a microprocessor, microcontroller, programmable logic device or other computational device, a general purpose computer (e.g. a PC) or a server.

Figure 3:
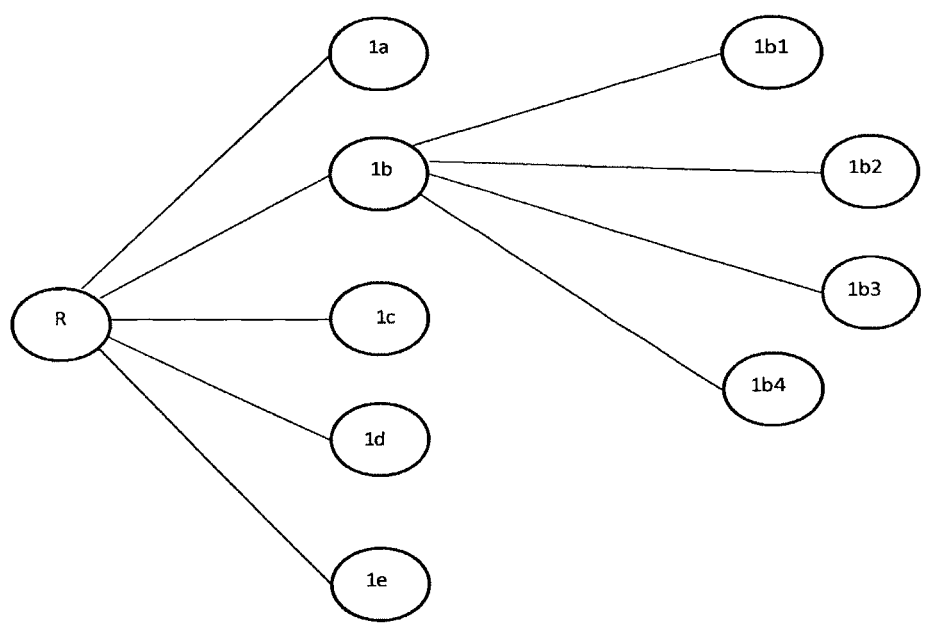
FIG. 3 shows a diagram of an example network of options in an embodiment of the invention.

Option network 410 is a network of nodes and branches such as is shown in FIG. 3 representing a choice tree. Root R is the starting point and the first set of options 1a to 1e are depicted as alternative branches from root R. Selection of a selected first option from amongst choices 1a to 1e results in performance of a task associated with the selected first option, if not a node, or display of a second set of options such as 1b1 to 1b4 if the selected first option is a node such as 1b.

Referring again to FIG. 1, navigation controller 30 has a navigation region definer for defining a navigation region on the display 200, and an option set displayer 320 for displaying the first option set 1a to 1e branching from root R or the second option set 1b1 to 1b4. Option set displayer 320 is adapted to display either the first or second option set as the navigation region divided into a plurality of sub-regions and may also comprise an area calculator 321 for representing a measure of importance or relevance of the respective option by the area of each sub-region. The first set of options may correspond to a set of categories of records in a database 420 and the measure of importance or relevance may be the number of records in each category. Selection recorder 330 is adapted to detect activation of selector 220 such as a mouse click and the position of pointer 210 such as a mouse pointer and thereby record the selection and identity of the selected first or second option. If the selected first option is a node, selection magnifier 340 is adapted to magnify the display of the selected first sub-region to substantially fill the navigation region so as to provide a zooming effect.

Figure 2:
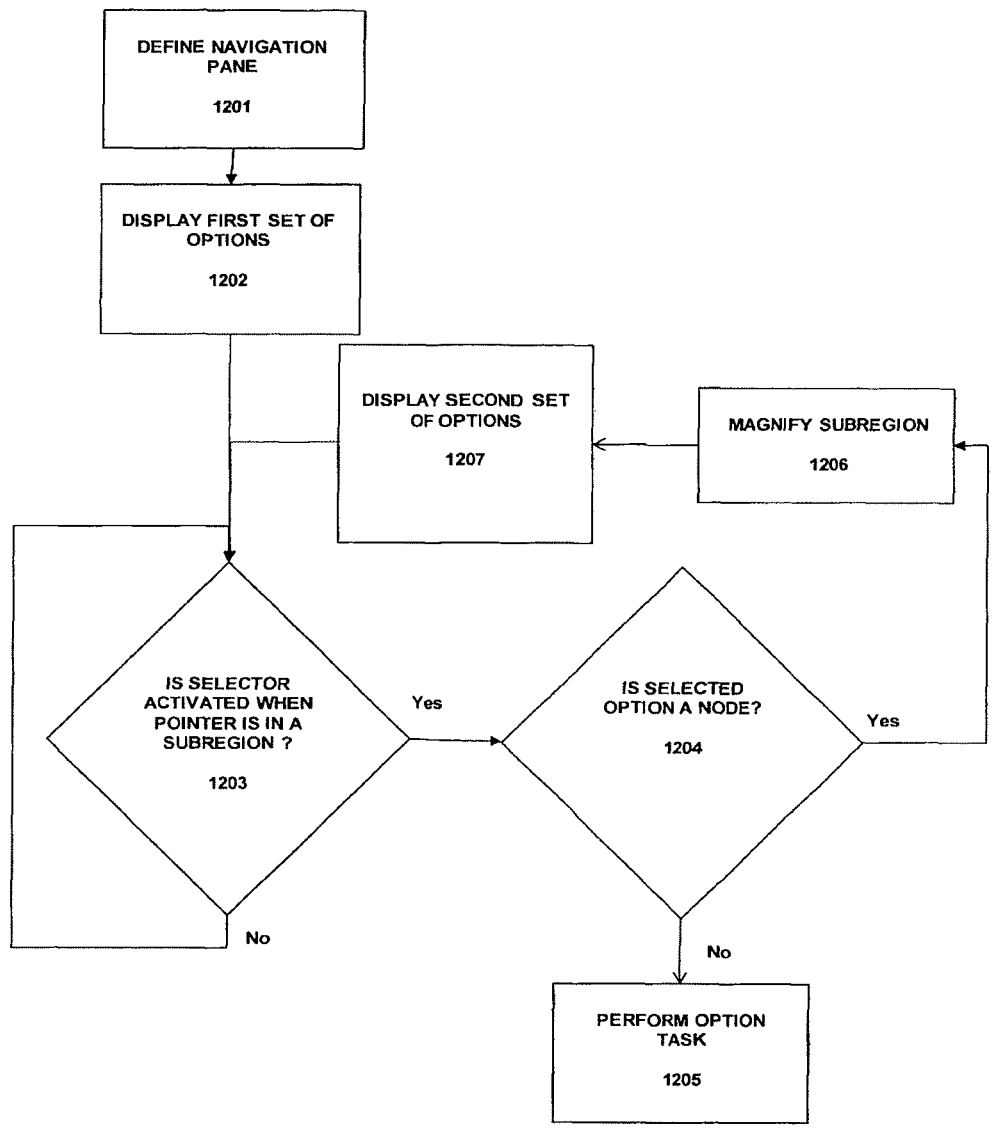
FIG. 2 shows a flow diagram for the method of navigation of an embodiment of the current invention.
Figure 4:
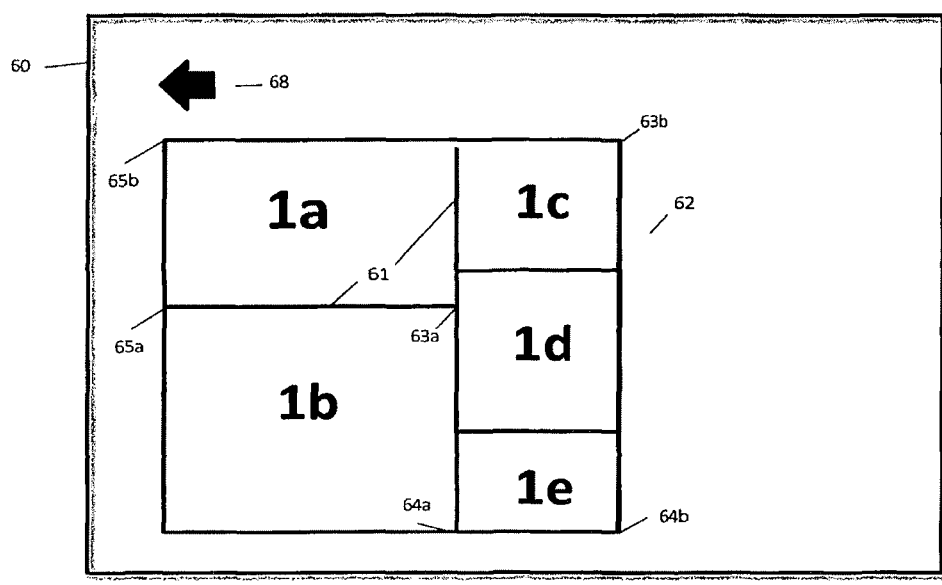
FIG. 4 shows a conceptual representation of a display of a first option set in the embodiment of FIG. 3.
Figure 5:
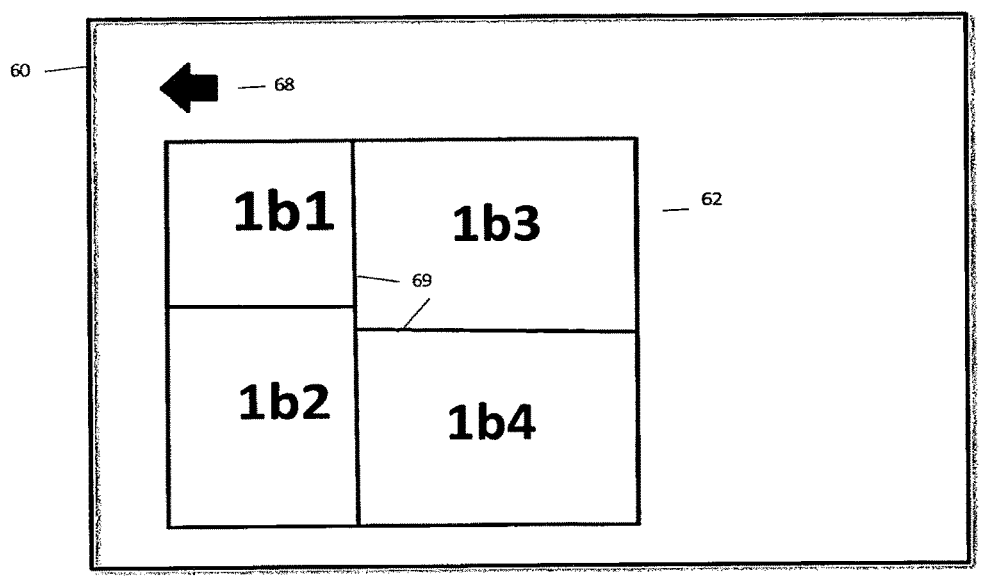
FIG. 5 shows a conceptual representation of a display of a second option set in the embodiment of FIG. 3 after selection from the first option set.

Refer now to FIG. 2, showing a flow diagram of the operation of the navigation controller in an embodiment, and also refer to FIGS. 4 and 5 showing conceptual representations of example display screens. In step 1201, the navigation pane 62 on display 60 is defined. Pane 62 is implemented in Action Script software to allow the contents to be zoomed in and out. In step 1202, first set of options 1a to 1e is displayed in the navigation pane 62 as divided sub-regions separated by lines such as 61. The options corresponding to the sub-regions may be identified with text or other meaningful symbols or images. In step 1203, selector 220 is monitored for activation when pointer 210 is within one of the sub-regions. When this occurs, step 1204 determines whether the selected option is a node by consulting option network 410. If not, in step 1205 the relevant option task is performed, and if so, in step 1206 the selected first option, in this case the sub-region 1b, is magnified in a zooming motion so that corners 63a, 64a, and 65a are mapped to navigation pane corners 63b, 64b, and 65b. In step 1207, the second set of options 1b1 to 1b4 is displayed by replacing the "1b" mark with dividing lines such as 69 delineating sub-regions corresponding to the second set. Step 1207 may occur contemporaneously or before step 1206, to enhance the sensation of zooming into a landscape or map.

Figure 6:
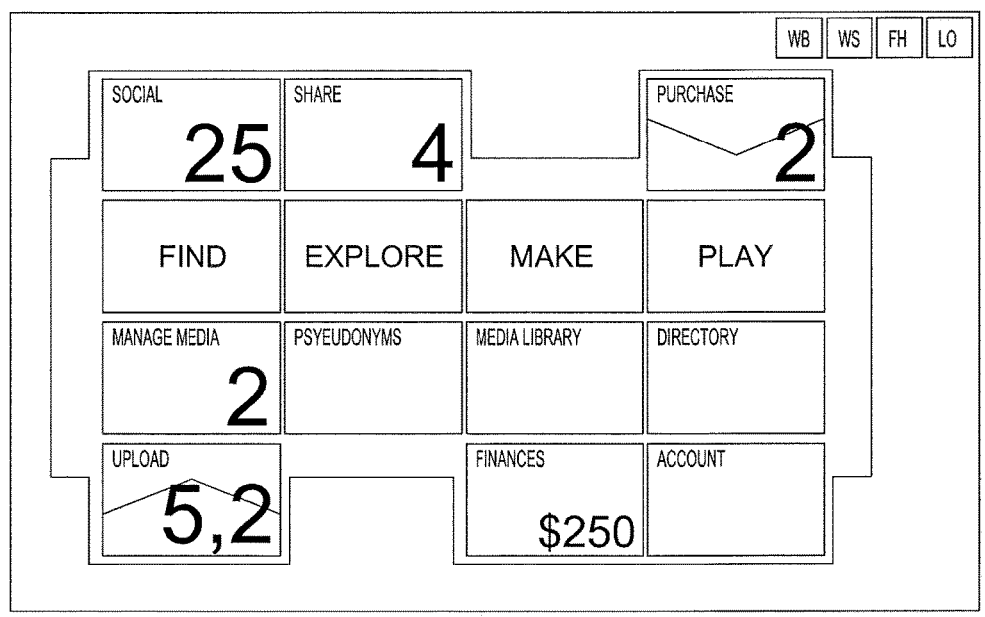
Figure 7:
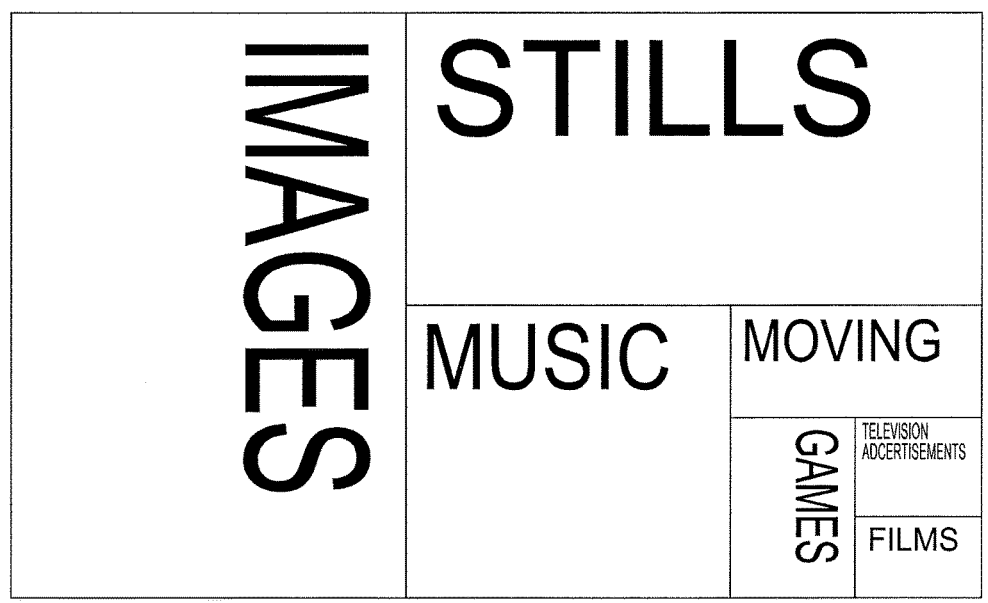

Optionally, step 1207 can occur even before selection step 1203 so that the sub-regions of the second set are visible faintly in miniature whether or not the second option is selected. This can be seen for the option "Media Items" in the actual display shown in FIG. 6. Before that option is selected, the options branching from the "media items" node are already faintly visible. Once selected, FIG. 7 shows the sub-regions expanded out. FIG. 8 shows a further layer of options accessed by selecting the "Music" option in FIG. 7, this time not showing the faint divisions of the level below.

Backup button 68 shown in FIGS. 4 and 5 may be used to reverse the process to go back to the display of the first set of options, preferably by zooming out within the navigation pane. Backup button 68 is conceptual only and may be equivalently provided by other functions of the selector such as mouse double-click, or down-scroll.

Now referring to FIGS. 9, 10 and 11, there is shown a series of screenshots in accordance with another example with application to financial data. FIG. 9 shows display of a first option set representing the top branches of the network, consisting of the categories "reports", "portfolio", "network" and "watchlist". FIG. 10 shows the result where the "reports" option is selected. The top of the screen contains a filtering control bar that the user can use to increase or decrease the range of options displayed. The left of the control bar is an alphanumeric search box. When characters are typed into the box, only categories containing the character string are displayed. There are four on/off buttons also on the control bar. These are labelled "region", "asset class", "dashboard" and "widget". In the state shown in FIG. 10, all four buttons are on, and so region categories such as US, CHINA etc are displayed along with asset class categories such as EQUITY, CURRENCY etc. In this state, several data records can be accessed from different options. For example, Chinese equities can be accessed by selecting CHINA or EQUITIES. FIG. 11 shows the rearrangement that occurs if the "region" button on the toolbar is clicked off, whereupon all the options that are regions disappear.

It will be appreciated from the foregoing example that the option network may be dynamic, with nodes and branches changing in accordance with user filtering or other dynamic events.

It will further be appreciated that although the invention is described as navigating first and second option sets, this is a minimum definition of a non-trivial option network and the invention extends to additional option sets and the zooming and displaying of sub-regions may be repeated as long as there are further downstream nodes to visit. In this way an option network navigation can be experienced as though it is navigation of a map or landscape such as in Google Earth, with new levels of detail revealed as the view is zoomed in. The analogy is particularly powerful when the navigation is a database search and the options represent subsets of the data. The term "option" in this specification extends to any items that may be represented amongst a set of items, and does not necessarily imply an outcome to be provided on selection. For example, in a database navigation some of the options may represent records and some may represent categories of records in a database, with selection of the category options providing access as a node to further records or categories but selection of the record options providing no further levels, but no or some other action such as detailed display of the record.

Persons skilled in the art will also appreciate that many variations may be made to the invention without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

What is claimed is:

1. A method of navigating a network of options for display to a user on a display device and selection by the user with a pointer and a selector, comprising:
defining a two-dimensional navigation region on a screen of the display device;
displaying, on the screen, a set of options branching from a node in the network as the navigation region divided into a plurality of sub-regions, the set of options being displayed non-symmetrically on the screen, a first displayed option having a first corner and a second simultaneously-displayed option having a second corner, wherein the first and second displayed options are zoomed on the screen so as to map the first and second corners to respective different corners of the navigation region on the screen;
displaying a control bar on the display screen adjacent the displayed set of options, the control bar having plural on-off buttons;
recording selection by the user of a selected option if the selector is activated by the user when the pointer is pointing within its corresponding sub-region on the screen; and if the selected option is a second node having a second set of options branching therefrom, repeating the steps of displaying and recording for the second set of options, wherein the displaying of the second option before selection comprises faint displaying on the screen of the divisions of the plurality of sub-regions for the second set of options branching from the second node in miniature within the sub-region associated with the second option so as to provide an enhanced sensation of navigation within a landscape,
wherein further selection of a sub-region causes display of a sub-sub-region on the screen, and
wherein activating at least one of the on-off buttons causes at least one sub-sub region to be eliminated from the display screen, and causes the remaining displayed sub-sub regions to be magnified on the display screen.

2. The method as claimed in claim 1, further comprising selecting a backup selector during display of the second set of options to cause the display within the navigation region to zoom out to display previous plural non-selected options again in the navigation region.

3. The method as claimed in claim 1, wherein the plurality of sub-regions is divided by non-circular border lines.

4. The method as claimed in claim 3, wherein an area of each sub-region corresponding to each of the set of options is a measure of importance or relevance of the respective option.

5. The method as claimed in claim 4, wherein the set of options corresponds to a set of categories of records in a database and the measure of importance or relevance is the number of records in each category.

6. The method as claimed in claim 1, wherein the set of options corresponds to a set of records or categories of records in a database.

7. A navigation system comprising:
a display pointer and selector, displayed on a screen, for navigation of a network of options by a user;
a navigation region definer for defining a navigator region on the screen;
an option set displayer for displaying, on the screen, a set of options branching from a node in the network as the navigation region divided into a plurality of sub-regions;
a control bar disposed on the screen adjacent the displayed set of options, the control bar having plural on-off buttons;
a selection recorder for recording selection by the user of a selected option from the set of options if the selector is activated by the user when the pointer is pointing within its corresponding sub-region; and a selection magnifier for magnifying the screen display of the corresponding sub-region of the selected option to a size that corresponds to a number of records in the selected sub-region, wherein the selection recorder records selection, on the screen, by the user of a sub-region, and wherein the selection magnifier magnifies the screen display of the corresponding plural sub-sub-regions of the selected sub-region to a size that corresponds to a number of records in the selected sub-sub-region, and wherein activating at least one of the on-off buttons causes at least one sub-sub region to be eliminated from the screen, and causes the remaining displayed sub-sub regions to be magnified on the screen.

8. A navigation controller for controlling navigation of a network of options by a user manipulating a pointer and selector on a display screen, comprising:

a navigation region definer for defining a navigation region on the screen;

an option set displayer for displaying, on the screen, a set of options branching from a node in the network as the navigation region divided into a plurality of sub-regions on the screen;

a selection recorder for recording selection by the user, on the screen, of a selected option from the set of options, if the selector is activated by the user when the pointer is pointing within its corresponding sub-region on the screen; and a control bar disposed on the screen adjacent the displayed set of options, the control bar displaying plural on-off buttons;

a selection magnifier for magnifying the screen display of the corresponding sub-region of the selected option to fill the navigation region if the selected option is a node in the network of options, wherein the screen displays abutting sub-region boundaries which are non-symmetrical with respect to boundaries of the navigation region, wherein displaying of the sub-region before its selection comprises faint displaying of the divisions of a plurality of sub-sub-regions within the sub-region, and wherein the user activating at least one of the on-off buttons on the screen causes at least one sub-sub region to be eliminated from the screen display, and causes the remaining displayed sub-sub regions to be magnified on the screen display.

9. The navigation controller as claimed in claim 8, wherein at least one of the navigation region definer, the option set displayer, the selection recorder and the selection magnifier is implemented at least in part, by a processor executing code stored in a memory.

10. Computer program code which when executed by a computer causes the computer to implement the method of navigating a network of options of claim 1.

11. A non-transitory computer readable medium comprising the program code of claim 10.

12. The method as claimed in claim 1, wherein the step of displaying the set of options non-symmetrically includes the step of displaying, on the screen, the set of options with abutting boundaries which are non-symmetrical with respect to boundaries of the navigation region.

13. The method as claimed in claim 1, wherein the step of displaying the set of options non-symmetrically includes the step of displaying, on the screen, at least one text word in a vertical orientation while displaying at least one text word in a horizontal orientation.

14. The method as claimed in claim 1, wherein the step of displaying the set of options non-symmetrically includes the step of displaying, on the screen, at least one option with alpha and numeric information.

15. The method as claimed in claim 1, wherein the step of displaying the set of options non-symmetrically includes the step of displaying, on the screen, a filtering control bar at a top of the non-symmetric display of options.

16. The method as claimed in claim 1, wherein the second set of options are also displayed non-symmetrically on the screen.

17. The method as claimed in claim 1, wherein, when the user selects an option, an image corresponding to the selected option fills the two-dimensional navigation region on the screen.

18. The method as claimed in claim 1, wherein a repeated displaying step includes the step of magnifying the screen display of the corresponding sub-region of the selected option to a size that corresponds to a number of records in the selected sub-region.

* * * * *